US009471521B2

(12) United States Patent
Dondini et al.

(10) Patent No.: US 9,471,521 B2
(45) Date of Patent: Oct. 18, 2016

(54) COMMUNICATION SYSTEM FOR INTERFACING A PLURALITY OF TRANSMISSION CIRCUITS WITH AN INTERCONNECTION NETWORK, AND CORRESPONDING INTEGRATED CIRCUIT

(71) Applicant: STMicroelectronics S.r.l., Agrate Brianza (IT)

(72) Inventors: Mirko Dondini, Catania (IT); Daniele Mangano, San Gregorio di Catania (IT); Giuseppe Falconeri, Sant'Agata li Battiati (IT)

(73) Assignee: STMICROELECTRONICS S.R.L., Agrate Brianza (IT)

( * ) Notice: Subject to any disclaimer, the term of this patent is extended or adjusted under 35 U.S.C. 154(b) by 42 days.

(21) Appl. No.: 14/278,403

(22) Filed: May 15, 2014

(65) Prior Publication Data

US 2014/0344485 A1  Nov. 20, 2014

(30) Foreign Application Priority Data

May 15, 2013  (IT) .............................. TO2013A0387

(51) Int. Cl.
*G06F 13/28*  (2006.01)

(52) U.S. Cl.
CPC ................................... *G06F 13/28* (2013.01)

(58) Field of Classification Search
CPC ........................................................ G06F 13/28
See application file for complete search history.

(56) References Cited

U.S. PATENT DOCUMENTS

| | | | | |
|---|---|---|---|---|
| 6,151,641 A * | 11/2000 | Herbert | ................. | G06F 3/0607 710/22 |
| 8,271,700 B1 * | 9/2012 | Annem | ................... | G06F 13/28 710/22 |
| 2002/0038393 A1 | 3/2002 | Ganapathy et al. | | |
| 2007/0266187 A1 * | 11/2007 | Senoo | ..................... | G06F 13/28 710/26 |
| 2008/0294913 A1 * | 11/2008 | Nakagoe | ............... | H04L 9/0637 713/193 |
| 2008/0320254 A1 * | 12/2008 | Wingard | ............. | G06F 12/0607 711/157 |
| 2011/0131346 A1 | 6/2011 | Noeldner et al. | | |
| 2011/0320644 A1 * | 12/2011 | Craddock | ........... | G06F 12/1009 710/22 |
| 2012/0079172 A1 * | 3/2012 | Yoshida | .............. | G06F 12/0607 711/103 |
| 2012/0131309 A1 * | 5/2012 | Johnson | .................... | G06F 9/30 712/41 |

OTHER PUBLICATIONS

Italian Search Report, dated Sep. 12, 2013, for Italian Application No. TO20130387, 2 pages.

* cited by examiner

*Primary Examiner* — Jing-Yih Shyu
(74) *Attorney, Agent, or Firm* — Seed IP Law Group PLLC (57) ABSTRACT

A communication system is arranged to interface a plurality of transmission circuits with an interconnection network. Each transmission circuit generates read requests and/or write requests. The communication system includes a first circuit that operates independently of the communication protocol of the interconnection network. In particular, the first circuit includes, a) for each transmission circuit a communication interface configured for receiving the read requests and/or write requests from the respective transmission circuit, b) a segmentation circuit configured for dividing, i.e., segmenting, the read requests and/or write requests received from the transmission circuits into transfer segments, and c) an interleaving circuit configured for generating, via an operation of interleaving of the transfer segments, a series of segments. The communication system also includes a second circuit configured for converting the transfer segments of the series of segments into data packets according to the protocol of the interconnection network and for transmitting the data packets to the interconnection network.

18 Claims, 6 Drawing Sheets

COMMUNICATION SYSTEM FOR INTERFACING A PLURALITY OF TRANSMISSION CIRCUITS WITH AN INTERCONNECTION NETWORK, AND CORRESPONDING INTEGRATED CIRCUIT

BACKGROUND

1. Technical Field

The present disclosure relates to a communication system for interfacing a plurality of transmission circuits with an interconnection network. Embodiments have been developed with particular attention paid to possible use in communication interfaces that are typically used for transmission of the DMA (Direct Memory Access) type.

2. Description of the Related Art

Systems within an integrated circuit (Systems-on-Chip—SoCs) and systems in a single package (Systems-in-Package—SiPs) typically comprise a plurality of circuits that communicate with one another via a shared communication channel. For instance, the aforesaid communication channel may be a bus or a communication network, for example a Network-on-Chip (NoC) or Network-in-Package (NiP), and is frequently referred to as "interconnection network" (ICN).

For instance, the above SoCs are frequently used for processors designed for mobile or multimedia applications, for example smartphones, set-top boxes, or routers for domestic uses.

Figure 1:
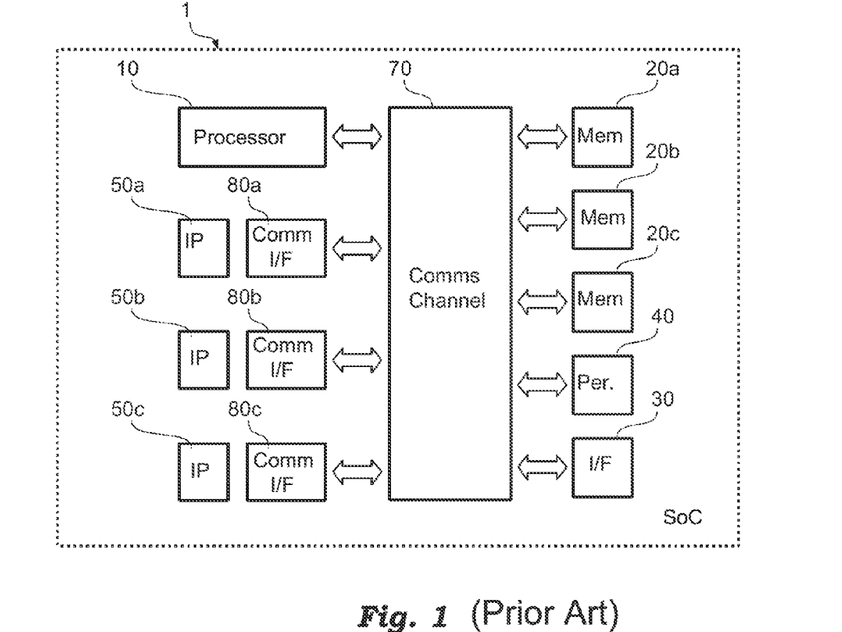

FIG. 1 shows an example of a typical SoC 1.

In the example considered, the system comprises a processor 10 and one or more memories 20. For instance, illustrated in the example considered are a small internal memory 20a, for example a RAM (Random-Access Memory), a non-volatile memory 20b, for example a flash memory, and a communication interface 20c for an external memory, for example a DDR memory.

In the example considered, the system also comprises interface circuits 30, for example input and output (I/O) ports, a UART (Universal Asynchronous Receiver-Transmitter) interface, an SPI (Serial Peripheral Interface) interface, a USB (Universal Serial Bus) interface, and/or other digital and/or analog communication interfaces.

In the example considered, the system also further comprises peripherals 40, for example comparators, timers, analog-to-digital or digital-to-analog converters, etc.

In the example considered, the aforesaid modules, i.e., blocks 10, 20, 30 and 40, are connected together through a interconnection network 70, i.e., an interconnection network, for example a bus or preferably a Network-On-Chip (NoC).

The general architecture described previously is frequently used for conventional micro-controllers, which renders any detailed description here superfluous. Basically, this architecture enables interfacing of the processor 10 with the various blocks 20, 30 and 40 via software commands that are executed by means of the processor 10.

In multimedia or mobile processors other blocks 50 are added to the above generic architecture, which will be referred to hereinafter as Intellectual Property (IP) circuits. For instance, the aforesaid IP blocks 50 may comprise an image or video encoder or decoder 50a, an encoder or decoder of audio signals 50b, a WiFi communication interface 50c, or in general blocks, the hardware structure of which is optimized for implementation of functions that depend upon the particular application of the system. The aforesaid blocks may even be autonomous and interface directly with the other blocks of the system, for example the memories 20 and the other peripherals 30 and 40.

Typically, associated to each IP block 50 is a respective communication interface 80 configured for exchanging data between the IP block 50 and the interconnection network 70.

Figure 2:
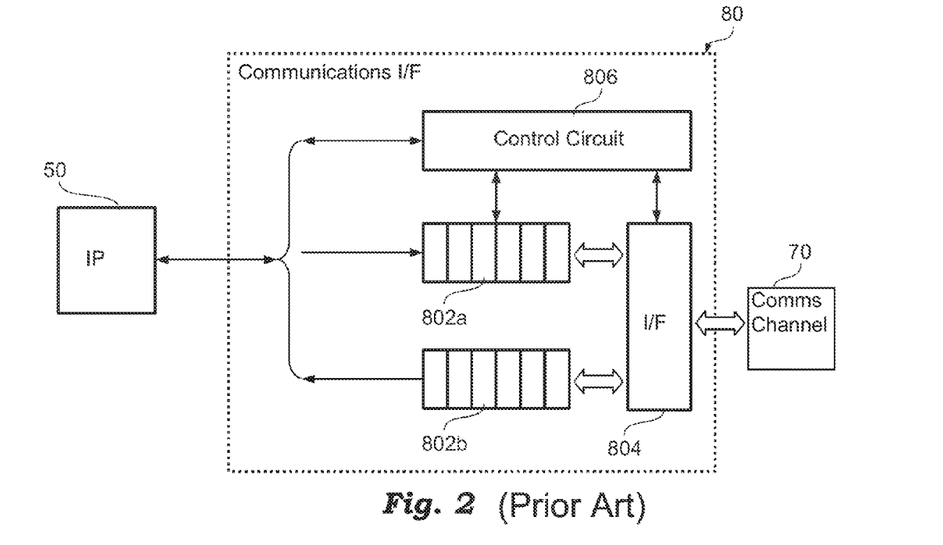

For instance, FIG. 2 shows a block diagram of a typical communication interface 80 for an IP block 50.

In the example considered, the communication interface 80 comprises:

- a transmission memory 802a for temporary saving output data, i.e., the data coming from the respective IP block 50;
- a reception memory 802b for temporary saving input data, i.e., the data coming from the interconnection network 70;
- an interface 804 for exchanging data between the memories 802a, 802b and the interconnection network 70, for example for sending the data saved in the transmission memory 802a to the interconnection network 70 and saving the data received from the interconnection network 70 in the reception memory 802b; and
- a control circuit 806, which, for example, controls the flow of data between the IP block 50 and the interconnection network 70, monitors the state of the memories 802a and 802b, and generates the control signals for the IP block 50.

Typically, the reception memory 802b is a FIFO (First-In/First-Out) memory. However, in the case where the data received may be out of order, the reception memory 802b or the interface 804 may also re-order the data before they are written in the reception memory 802b.

In the example considered, no interface is illustrated for exchange data between the IP block 50 and the memories 802a and 802b, because typically the IP block 50 is able to exchange the data directly with the memories 802a and 802b, for example by exploiting the control signals generated by the control circuit 806.

Figure 3A:
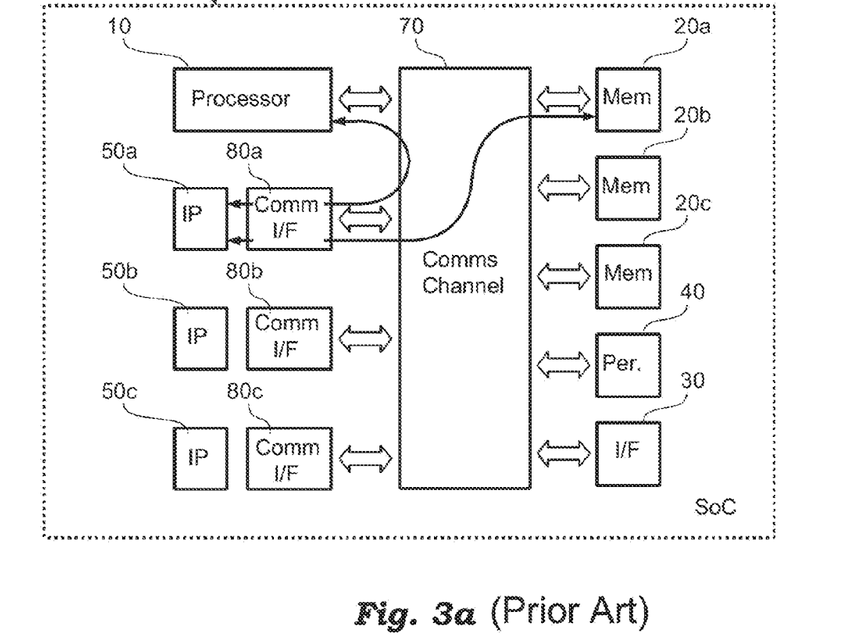
Figure 3B:
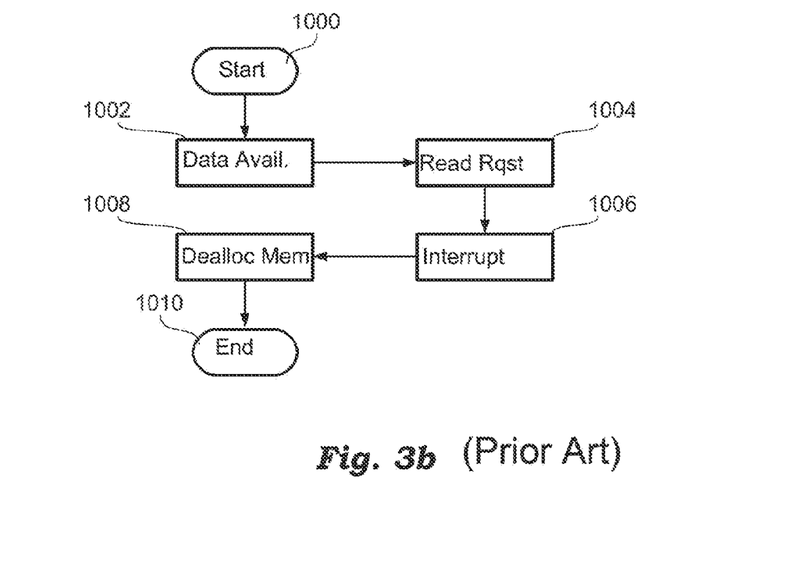

For instance, FIGS. 3a and 3b show a scenario of a typical data flow. In particular, FIG. 3a is a block diagram that shows the data flow of a typical transmission of data, and FIG. 3b is a flowchart that shows the respective transmission steps.

After an initial step 1000, the processor 10 sends, in a step 1002, an instruction to the block 50a indicating that the memory 20a contains data for the block 50a. For instance, for this purpose, the processor 10 may send to the block 50a an instruction indicating a start address and an end address within the memory 20a (or else a start address and the length of the transfer). Alternatively, the processor 10 could configure the aforesaid area by writing the start address and the end address directly in a configuration register of the block 50.

Next, in a step 1004, the block 50a reads the data from the memory 20a by means of the respective communication interface 80a. In particular, typically, the communication interface 80a sends for this purpose to the memory 20a a read request, and the memory 20a sends to the communication interface 80a the data requested. For instance, typically both the read request and the response are sent through the interconnection network 70 via data packets.

Finally, once all the data have been read, the block 50a or the communication interface 80a generates, in a step 1006, an interrupt that signals to the processor 10 the fact that the transmission has been completed.

Next, the processor 10 can allocate, in a step 1008, the respective area of the memory 20a to another process, and the procedure terminates in a step 1010.

Consequently, typically the blocks 50 access the memory 20 by means of a Direct Memory Access (DMA), i.e., the blocks 50 access the memory directly without any intervention on the part of the processor 10.

Typically, the aforesaid DMAs may be of two types: a data-write request or a data-read request. The read and write DMA transfers are substantially identical except for the data:

in the case of a write request, the data are sent by the IP block 50 that has requested the DMA; and in the case of a read request, the data are sent by the destination block that receives the read request.

Both of the requests are typically characterized either by a start address and an end address from which data is to be read/written or by a start address and a length of the transfer.

For instance, the above address can comprise the address of a node of a NoC, the memory address within the destination (for example, in the case of a memory), or a combination of both. Consequently, both the write requests and the read requests are typically accompanied by a start address that identifies the addressee of the request, and the aforesaid address may belong to the memory map of the system. In this case, the interconnection network 70 decodes the address received and identifies the addressee that is to receive or supply the data and conveys appropriately the replies that it receives from the addressee to the source of the communication.

Furthermore, the various blocks of the system 1 may also simultaneously access the interconnection network 70.

For instance, the blocks 10 and 50 are typically the communication sources (initiators), which request DMA transfers (both writing and reading transfers) in competition with one another, where each could even present a plurality of channels. Instead, the blocks 20, 30 and 40 are typically addressees, which receive or send data in accordance with the requests.

For this reason, there may exist simultaneously a number of DMA communication channels, which, once converted into the protocol of the interconnection network 70, are to be transmitted through the interconnection network 70 itself.

Figure 4:
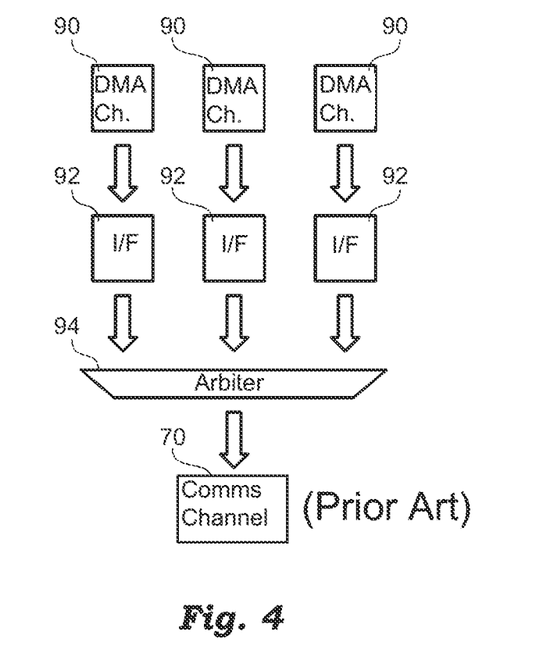

FIG. 4 shows an example of a typical solution that can be used for transmission of a plurality of DMA communications coming from respective circuits designated as a whole by 90. For instance, the circuits 90 may be the processor 10 and/or an IP block that sends a data-read request or a data-write request.

Typically, each transmission circuit 90 has associated to it an interface circuit 92 that converts the DMA transmission coming from the respective circuit 90 into a communication that uses the protocol of the interconnection network 70; i.e., the interface circuit 92 makes a conversion between the transport layer and the link layer. For instance, the blocks 10-40 are typically optimized for a given architecture, and the interface circuit 92 is directly integrated in the respective block. Instead, the IP blocks 50 are typically not optimized for a specific communication protocol, and consequently an additional interface is frequently required (see, for example, the blocks 80 in FIG. 1 or FIG. 3*a*). For instance, as mentioned previously, the interface circuit 92 could segment the DMA communication and add respective headers for forming data packets that can be forwarded to the destination through the interconnection network 70.

Frequently, different interface circuits 92 have to transmit data simultaneously. For this reason, the interconnection network 70 typically has associated a circuit 94 that regulates access to the interconnection network 70, which is typically referred to as arbiter, planner, or scheduler. For this reason, the interface circuit 92 typically comprises a memory (see FIG. 2) for temporarily saving the data coming from the respective circuit to render the operation of the respective circuit 90 independent of possible delays in the transmission of the data over the interconnection network 70.

Typically, the arbiter 94 is directly integrated in the interconnection network 70 and could be, for example, a router node of a NoC. In fact, in general, in the solution illustrated in FIG. 4, also the arbiter 94 uses the protocol of the interconnection network 70 and can, for example, analyze the header of the various packets for determining the priority of the transmissions in such a way as to guarantee a certain quality of service (QoS).

Consequently, in general, numerous DMA channels may exist simultaneously, and hence the requirements of performance, for example the efficiency of access to the memories 20, the latency of the communications, and the bandwidth, are frequently difficult to achieve. Furthermore, the occupation of area of silicon and the energy consumption are other constraints that today represent a fundamental added value for integrated circuits.

BRIEF SUMMARY

The embodiment of the present disclosure provides solutions that will overcome one or more of the drawbacks outlined above.

With a view to achieving the aforesaid object, the subject of the disclosure is a communication interface having the characteristics specified in the claims. The invention also regards a corresponding system and integrated circuit.

The claims form part of the technical teaching provided herein in relation to the disclosure.

As mentioned previously, the present description regards communication systems for interfacing a plurality of transmission circuits with an interconnection network.

For instance, in various embodiments, the transmission circuits generate read requests and/or write requests. Typically, the communications are of the Direct Memory Access (DMA) type, where the write request comprises a destination address at which the data are to be written and the respective data that are to be written, and the read request comprises a destination address from which data are to be read and information that enables identification of the number of datums that are to be read.

In various embodiments, the communication system comprises a first circuit that operates independently of the communication protocol of the interconnection network.

For instance, in various embodiments, the aforesaid circuit comprises a segmentation circuit configured for dividing, i.e., segmenting, the read requests and/or write requests received into transfer segments. In particular, the aforesaid transfer segments represent smaller write or read requests that involve writing or reading of a certain number of data, which corresponds at the most to the number of data of the respective write or read request made by the respective transmission circuit.

For instance, in various embodiments the segmentation circuit comprises for each transmission circuit a separator that segments the read requests and/or write requests received from the respective transmission circuits into transfer segments, and a circuit for controlling the segmentation process that determines for each separator a respective size of the segment, i.e., the number of datums that are to be read or written.

In various embodiments, the data segments are supplied to an interleaving circuit, which generates, via an interleaving operation, a series of transfer segments. For instance, in various embodiments, the interleaving circuit has associated thereto an arbitration circuit that selects the transfer segments coming from the segmentation circuits on the basis of a scheduling method.

In various embodiments, the series of segments is supplied to a second circuit, such as an interface circuit, which converts the transfer segments into data packets according to the communication protocol of the interconnection network and transmits the data packets to the interconnection network.

BRIEF DESCRIPTION OF THE SEVERAL VIEWS OF THE DRAWINGS

Non-limiting and non-exhaustive embodiments are described with reference to the following drawings, wherein like labels refer to like parts throughout the various views unless otherwise specified. Various embodiments will now be described purely by way of non-limiting examples with reference to the annexed drawings, wherein:

FIGS. 1 to 4, which illustrate conventional SoC structures, have already been described previously.

DETAILED DESCRIPTION

In the ensuing description, various specific details are illustrated, aimed at an in-depth understanding of the embodiments. The embodiments may be implemented without one or more of the specific details, or with other methods, components, materials, etc. In other cases, known structures, materials, or operations are not illustrated or described in detail so that various aspects of the embodiments will not be obscured.

Reference to "an embodiment" or "one embodiment" in the framework of the present description is intended to indicate that a particular configuration, structure, or characteristic described in relation to the embodiment is comprised in at least one embodiment. Hence, phrases such as "in an embodiment" or "in one embodiment" that may be present in different points of the present description do not necessarily refer to one and the same embodiment. Furthermore, particular conformations, structures, or characteristics may be combined in any adequate way in one or more embodiments.

The references used herein are provided merely for convenience and hence do not define the sphere of protection or the scope of the embodiments.

As mentioned previously, the present disclosure provides solutions that will enable transmission of a plurality of DMA communications through an interconnection network 701, efficiently and at a low cost.

Figure 5:
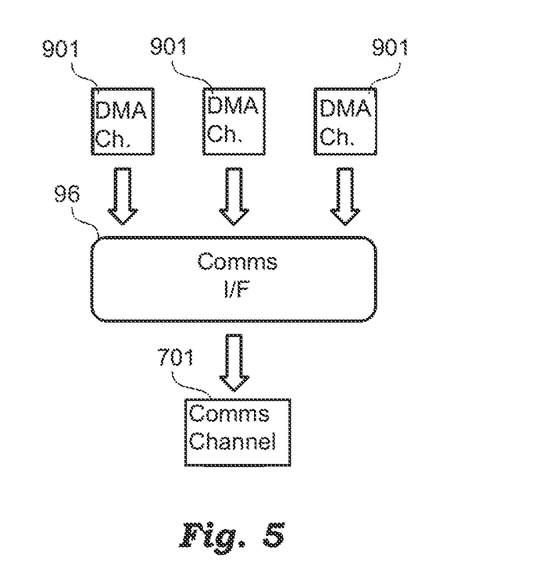
FIGS. 5 to 9 show various details of a communication interface according to the present description.

FIG. 5 shows a possible embodiment of a solution that can be used for transmission of a plurality of DMA communications coming from respective circuits designated as a whole by 901, for example the IP blocks.

Whilst in FIG. 4 one interface circuit 92 has been used for each circuit 90, in the embodiment considered just one communication interface 96 is used that is directly able to handle a plurality of DMA transmissions by means of a single connection to the interconnection network 70.

In the embodiment considered, the aforesaid communication interface 96 is, however, configured for converting the DMA transmissions coming from the circuits 901 in communication that use the protocol of the interconnection network 701; i.e., the communication interface 96 makes a conversion between the transport layer and the link layer. For instance, in various embodiments, the communication interface 96 directly carries out segmentation of each DMA transmission that it receives; i.e., it divides each DMA transfer into smaller transfers (referred to as "segments") which may be interleaved with other segments of other DMAs received by the same communication interface and then sent on over the interconnection network 701. These segments may be write segments, hence accompanied with the corresponding data, or read segments, hence with just the addresses of the memory areas that the segment wishes to access for receiving data.

Consequently, the communication interface 96 could be used, for example, for interfacing a plurality of IP blocks and/or "multi-DMA" IP blocks, which support a number of DMA channels, with the interconnection network 701. The present description mainly regards the part of transmission of the DMA communications to the interconnection network 701. However, the communication interface 96 could also handle the reception part. For instance, the reception part may be implemented via a data buffer, where a certain memory space is assigned to each DMA channel. For instance, a possible reception buffer that could be used for this purpose is described in the Italian patent document No. TO2013A000004, the contents of which are incorporated herein for reference.

Figure 6:
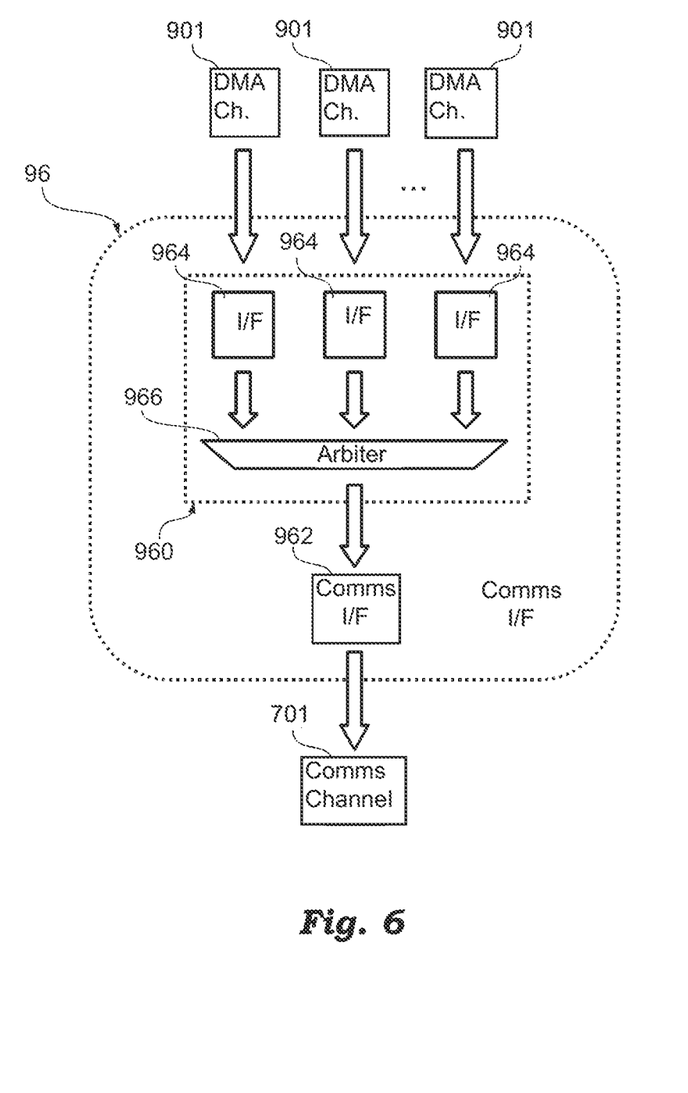

FIG. 6 shows a possible embodiment of the communication interface 96.

In the embodiment considered, the communication interface 96 comprises two circuits 960 and 962.

The first circuit 960 operates independently of the protocol of the interconnection network 701 and handles DMA communication with the transmission circuits 901, segmentation of the DMAs received into smaller units, of shorter length, and interleaving of these with other units generated for other DMAs coming from other channels connected to the same circuit 960. For instance, in the embodiment considered, the circuit 960 comprises for this purpose:

a) for each circuit 901 an interface 964 configured for handling the DMA communication with the respective circuit 901;

b) for each circuit 901 a splitter configured for dividing the DMA communications into smaller parts (segments); and c) an arbiter 966 configured for selecting the various segments coming from the various DMA channels, in accordance with the programmed arbitration algorithm, thus producing interleaving of the segments on the only channel available.

Instead, the second circuit 962 is configured for handling communication with the interconnection network 701, i.e., for sending the transfer segments (which may contain data and control information) received from the arbiter 966 to the interconnection network 701. For instance, the circuit 962 can associate the memory addresses and the data to packets (transactions) according to the communication protocol of the interconnection network 701 and can also handle the various control signals, for example flow-control signals, which are typically used for transmission of the data through the interconnection network 701.

Consequently, in the embodiment considered, the arbiter 966 operates independently of the protocol of the interconnection network 701, whereas the arbiter 94 illustrated in FIG. 4 operates already with packets according to the protocol of the interconnection network 70 and with the arbitration algorithms made available by the specific protocol.

Figure 7:
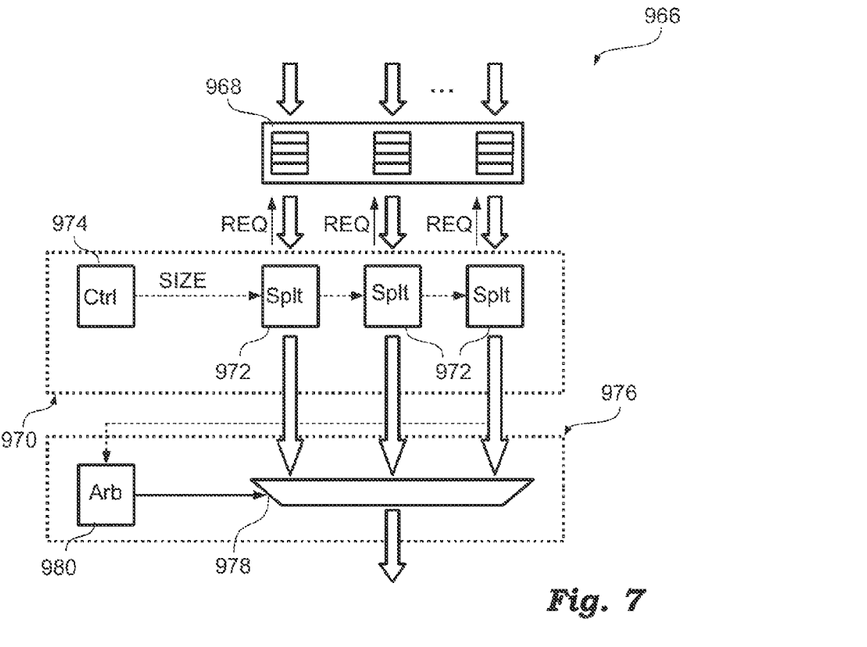

FIG. 7 shows a possible embodiment of the DMA splitters 964 and of the arbiter 966

In the embodiment considered, associated to each DMA channel is a buffer 968, for example a FIFO (First-In/First-Out) memory. These buffers 968 can also be obtained, in ways in themselves known, via a single memory, for example a RAM (Random-Access Memory), or a series of registers. For instance, the aforesaid buffer 968 may be integrated in the circuits 901, in the interfaces 964, or in the arbiter 966.

In the embodiment considered, the data saved in the buffers 968 are supplied to the segmentation circuits 970. For instance, in the embodiment considered, the circuit 970 requests, via a request signal REQ, new data from the buffer 968.

Basically, the circuit 970 is responsible for splitting of the DMA transfer for the benefit of the transmission circuits 901 and identified by a start address and a number of datums to be written or read (or else by an end address), into smaller units, referred to as "DMA segments", each in turn identified by a start address and a pre-set size of data, which may be fixed or programmable.

For instance, in one embodiment, the segmentation circuit comprises one DMA splitter 972 for each input channel and the size of data of the DMA segments (units) is specified via a segmentation-control circuit 974 as a function of the data available in the buffers 968 (in the case of a DMA write channel) or of the space available in the buffers 968 themselves (DMA read channel).

For instance, the control circuit 974 may determine the size of the transfer segments as a function of a maximum size and/or of the characteristics of the destination memory. For instance, in this way, the data of a request for writing in a DDR memory may be divided in such a way as to respect the physical limits of the memory, for example the so-called "page boundaries". Consequently, the aforesaid parameters may vary for different architectures and for different memories within a SoC. Consequently, in one embodiment, the operation of the control circuit 974 is configurable, for example via software commands that can be executed via the processor.

In one embodiment, the segmentation circuit 970 may also take into consideration filling of the buffers 968. For instance, in the case of a DMA write request, the control circuit 974 can verify the number of datums that are available in the respective buffer 968 and optimize the data write request for the aforesaid number of datums, for example by sending immediately the datums that are available without waiting for all the data of the DMA to be contained in the buffer 968. Instead, in the case of a DMA read request, the control circuit 974 can verify the number of memory locations that are free in the reception memory and generate autonomously a series of data read requests only for the number of datums that can be written in the reception buffer. In fact, in this way the transmission or reception of data is not blocked.

Figure 8:
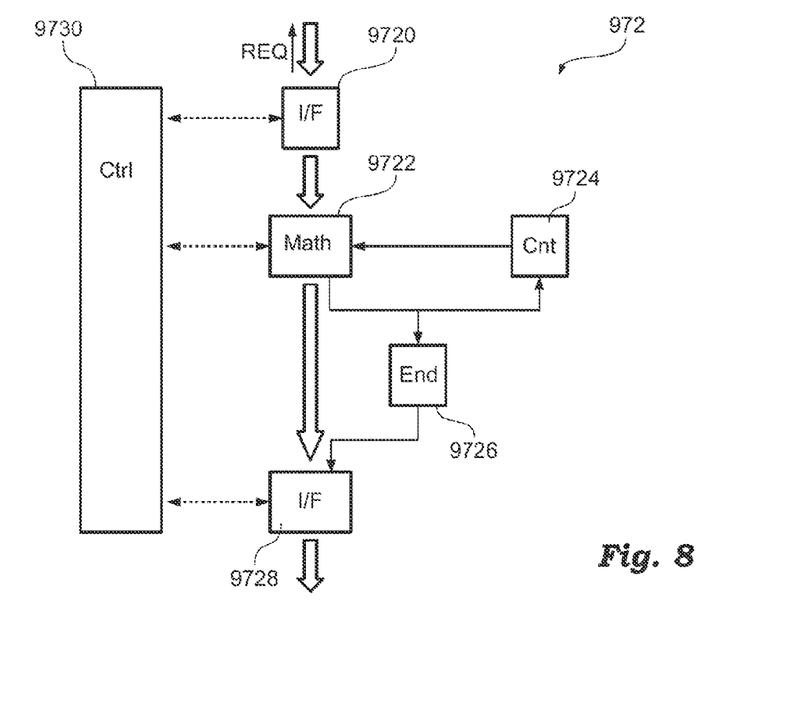

For instance, FIG. 8 shows a possible embodiment of the data separator 972.

In the embodiment considered, the separator 972 comprises an interface 9720 that handles the control signals for communication with the respective buffer 968, where the size of the data that are available for the respective DMA transmission is supplied by the control circuit 974.

In the embodiment considered, the size of the data that are to be transmitted is sent to a circuit 9722 that calculates the size of the current data segment.

For instance, in the embodiment considered, the aforesaid circuit is configured for:

a) in the case where the size of the data available exceeds the size supplied by the control circuit 974 (or corresponds to the aforesaid size), generating transfer segments that have the size indicated by the control circuit 974; and b) in the case where the size of the data available is smaller than the size supplied by the control circuit 974, generating transfer segments that comprise only the data that are available.

For instance, in the embodiment considered, the circuit 9722 has associated another two circuits 9724 and 9726. The first circuit 9724 is configured for calculating, whenever a DMA segment is generated by the circuit 9722, how many datums of the DMA are still to be transmitted (in the case of writing) or requested (in the case of reading), and the second circuit 9726 is configured for detecting when the last segment of the DMA being processed is generated, which represents the end of the transmission of a DMA transfer.

In the embodiment considered, the data segment and a signal that indicates whether the data segment is the last of the DMA transmission, i.e., the signal generated via the circuit 9726, are supplied to an interface 9728 that handles the control signals for communication with the subsequent arbitration stage 976 of FIG. 7.

In one embodiment, the operation of the separator 972 is monitored and controlled via a control circuit 9730, for example a finite-state machine. For instance, in one embodiment, the aforesaid finite-state machine can have two states:

a first state, IDLE, where the machine waits until transmission of a new DMA transfer is requested; and a second state, RUN, where the finite-state machine controls the process of segmentation of the DMA transfer and sending of each segment generated to the next stage, up to the end of the current DMA transfer.

Consequently, in the embodiment considered, the segmentation circuit supplies DMA segments, consisting of the start address of the segment, the size of data to be written or read, and control signals necessary for communicating the end of the DMA transfer.

In the embodiment considered, the aforesaid DMA segments are supplied to the arbitration stage 976, which decides which among from the segments coming from the various DMA channels must be sent first.

For instance, in the embodiment considered, the arbitration stage 976, which produces interleaving of segments belonging to DMA transfers of different channels, is constituted by a multiplexer 978 driven by a control circuit that implements the pre-selected arbitration algorithm. For instance, to select the next data segment, the arbitration control circuit 980 can use one of the following strategies: LRU (Least Recently Used) channel, WLRU (Weighted Least Recently Used) channel, DBA (Dynamic Bandwidth Allocation) channel, PPRI (Programmable Priority) channel, and/or LAT (Latency-based) channel.

In the embodiment considered, the segment of the DMA transfer that has been selected by the arbitration circuit 976 is then sent to circuit 962, which is shared among all the DMA channels, for conversion into the pre-selected communication protocol and transmission to the interconnection network 701.

As mentioned previously, the circuit 962 handles transmission of the DMA transfer segment over the interconnection network 701. For this purpose, the circuit 962 converts the DMA transfer segment into communication transactions that respect the communication protocol of the interconnection network 701. For instance, the circuit 962 can generate a certain number of transactions for each DMA segment that it receives, a number that depends upon the size of the data of the segment and upon other parameters of the protocol configurable by the user, such as, for example, the maximum length of a communication transaction. Each of these transactions comprises its own start destination address, from which there will start writing (or reading) of the data regarding the transaction, of the data (if they are write data), and of the control signals characteristic of the communication protocol of the interconnection network. The circuit 962 can moreover handle the flow control with the interconnection network and/or can handle other service functions, such as control of the order of the transactions between request and response, retransmission of the transactions in the case of transmission errors, etc.

In general, the segments produced by the splitting stage and that belong to one and the same DMA transfer are to be transmitted in a consistent and contiguous way so as to guarantee that the DMA transfer thus converted produces writing or reading from the start address of the destination and for the entire size of the DMA requested.

As mentioned previously, the arbitration circuit 976, which enables access to the shared resource represented by the circuit 962 (just one for all the DMA channels), produces interleaving of DMA transfer segments coming from different channels thereon. For this reason, the circuit 962 may have associated with it, i.e., coupled to it or integrated therein, a circuit 984, referred to as "context-storage stage", which handles the context of each DMA transfer in progress (one for each DMA channel). For instance, the context of a DMA transfer can be represented by the current address associated to the last communication transaction of the segment of the DMA sent to the interconnection network (and comprised between the start address and the end address of the DMA transfer). This address enables the circuit 962 to define from which address it will be necessary to continue the subsequent segment of the DMA itself, which will be received after other segments belonging to other transfers (and which hence access other memory areas). Consequently, in the embodiment considered, updating of the address between the transfer segments of a read request or write request is guaranteed by the circuit 984, which stores the last address generated by the transmission circuit 962 for the segment that is currently sent to the interconnection network so as to enable correct updating of the context when the subsequent segment of the DMA itself will undergo arbitration.

For instance, considering a write request that requests writing of twelve bytes in the address 0x0100, the circuit 960 of the corresponding channel could generate four write segments of a length equal to three bytes each. Consequently, the transmission circuit 962 would generate N transactions on the interconnection network for each segment received, where the respective first transaction of each segment is the address at the start of the corresponding segment, supplied by the context stage 984. For instance, in the case of an interconnection network with an 8-bit (byte) data bus, these addresses would be 0x0100 (first segment), 0x0103 (second segment), 0x0106 (third segment), 0x0109 (fourth segment).

The situation is substantially identical in the case of a read request; the only difference is that in this case the transmission circuit 962 does not associate the data regarding the request transactions sent on the interconnection network in so far as the data will be supplied by the addressee, in response, through the interconnection network.

Figure 9:
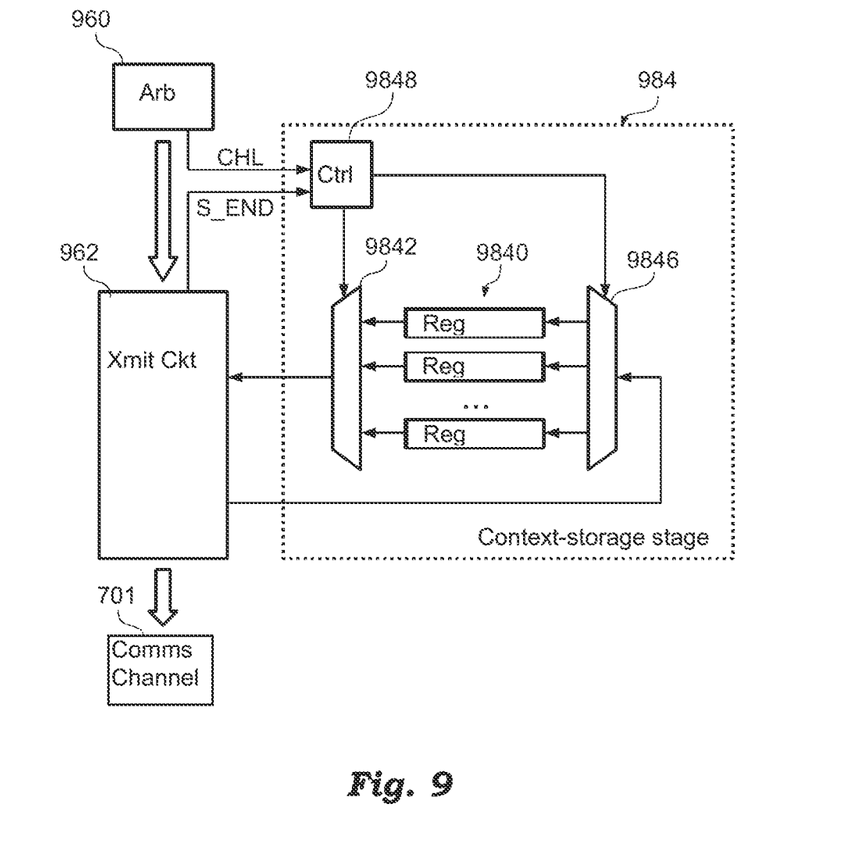

For instance, FIG. 9 shows a possible embodiment of the circuit 984.

In the embodiment considered, the circuit 984 comprises a plurality of registers 9840, i.e., one register 9840 for each transmission circuit 901, wherein the contexts of the DMA transfers being converted, one for each channel, are saved. For instance, the aforesaid registers may be implemented via a series of flip-flops or a RAM.

In the embodiment considered, the context-storage stage may be constituted by a set of M registers with N bits, where M corresponds to the number of DMA channels: each of these registers contains the fundamental information of the DMA regarding that particular channel to enable the circuit 962 to resume correctly transmission of its segments whenever they are interleaved by segments of other DMA transfers (connection between the segments of the DMA to guarantee contiguity thereof).

In the embodiment considered, writing and reading of the contexts is managed via a control circuit 9848. For instance, in one embodiment, the control circuit 9848 is configured for:

a) when the circuit 960 requests transmission of a given DMA transfer segment, reading the context saved in the register 9840 regarding the DMA transfer in progress, associated to which is the current segment in such a way as to provide it with the fundamental information that connects it to the segments of the DMA itself already sent previously (identified, for example, via a signal CHL); and b) when the transmission of the DMA transfer segment has been completed (identified for example via a signal S_END), writing the context in the respective register 9840 associated to the current DMA channel.

For instance, as illustrated in FIG. 9, to carry out reading and writing of the context-storage registers, the control circuit 9848 can use a multiplexer 9842 and a demultiplexer 9846, respectively.

The solutions described herein present numerous advantages as compared to the architecture described with reference to FIG. 4. For instance, in the solutions described herein only just one transaction stage is necessary that converts the DMA communications into communications that use the protocol of the interconnection network. Consequently, the solution occupies a smaller space and can be adapted more easily to modifications to the interconnection network. Furthermore, the arbitration criteria used by the circuit 960 can be optimized for the circuits 901 that are connected to the aforesaid arbiter, whilst the arbiter of FIG. 4 can only use the algorithms that are supported by the interconnection network 70.

Of course, without prejudice to the principle of the invention, the details of construction and the embodiments may vary widely with respect to what has been described and illustrated herein purely by way of example.

The various embodiments described above can be combined to provide further embodiments. These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A communication system to interface a plurality of transmission circuits with an interconnection network, wherein each transmission circuit is configured to generate only read requests, only write requests or both read requests and write requests, said communication system comprising:
   a first communication circuit, distinct from the interconnection network, the first communication circuit configured to operate independently from a communication protocol of the interconnection network, said first communication circuit comprising:
   a) for each transmission circuit, a communication interface configured to receive said read requests, write requests, or read and write requests from its respective transmission circuit;
   b) a segmentation circuit configured to divide said read requests, write requests, or read and write requests received from said plurality of transmission circuits into transfer segments;
   c) an interleaving circuit configured to interleave said transfer segments into a series of segments;
   d) an arbitration circuit associated with said interleaving circuit, the arbitration circuit configured to select transfer segments from said segmentation circuit based on a scheduling method; and
   a second communication circuit, distinct from the interconnection network and coupled between the first communication circuit and the interconnection network, the second communication circuit configured to convert said series of segments into data packets that conform to the communication protocol of said interconnection network, the second communication circuit further configured to transmit said data packets to said interconnection network.

2. The communication system of claim 1, wherein said first communication circuit is configured to receive Direct Memory Access (DMA) data requests.

3. The communication system of claim 2, wherein said first communication circuit is configured to receive at least one of:
   a write request having a destination address at which datums are to be written and the respective datums that are to be written; or
   a read request having a destination address from which datums are to be read and information representing a number of datums are to be read.

4. The communication system of claim 1, wherein said scheduling method is chosen from among: a Least Recently Used (LRU) method, a Weighted Least Recently Used (WLRU) method, a Dynamic Bandwidth Allocation (DBA) method, a Programmable Priority (PPRI) method, and a Latency-based (LAT) method.

5. The communication system of claim 1, wherein said segmentation circuit comprises:
   a separator coupled to each transmission circuit, each separator configured to generate the transfer segments; and
   a segmentation control circuit configured to direct a maximum transfer segment size for each separator, each respective maximum transfer segment size arranged to indicate:
   a) a maximum number of datums to be written with the respective transfer segment of a write request; or
   b) a maximum number of datums to be read with the respective transfer segment of a read request.

6. The communication system of claim 5, wherein said segmentation control circuit is configured to direct the maximum transfer segment size based on a characteristic associated with a destination of the transfer segment.

7. The communication system of claim 1, comprising:
   at least one buffer configured to store outgoing write request data and incoming read request data, wherein said segmentation circuit is configured to determine a transfer segment size according to:
   a) a size of data available in said at least one buffer for a write request received from the respective transmission circuit; or
   b) a space available in said at least one buffer for a data-read request received from the respective transmission circuit.

8. The communication system of claim 1, comprising:
   a context circuit associated with said second communication circuit, the context circuit configured to operate independently from the communication protocol of the interconnection network, the context circuit configured to handle a transmission context for each transmission circuit.

9. The communication system of claim 8, comprising:
   a plurality of registers associated with the context circuit, at least one of the plurality of registers coupled to each of the plurality of transmission circuits, wherein said context circuit is configured to:
   a) read a context saved in a first register of the plurality of registers when the first communication circuit selects and requests transmission of a first transfer segment belonging to a write request or a read request previously started, and
   b) write a context in a second register of the plurality of registers when the second communication circuit signals that transmission of a second transfer segment has been completed.

10. An integrated circuit comprising:
    a plurality of transmission circuits configured to generate direct memory access (DMA) data requests, the DMA data requests including read requests and write requests;
    an interconnection network configured to operate according to a first communication protocol; and
    a communication system configured to interface said plurality of transmission circuits with said interconnection network, the communication system including:
    a first circuit, distinct from the interconnection network, the first circuit configured to segment the DMA data requests into transfer segments and further configured to interleave the transfer segments into a series of interleaved DMA segments, wherein the segmenting and interleaving is independent of the first communication protocol, and wherein the first circuit is further to arbitrate the interleaving of the transfer segments according to a scheduling method; and
    a second circuit, distinct from the interconnection network and coupled between the first circuit and the interconnection network, the second circuit configured to convert said series of interleaved DMA segments into data packets that conform to the first communication protocol, the second circuit further configured to transmit the data packets to said interconnection network.

11. The integrated circuit of claim 10, wherein said write requests include datums to be written and a destination address for the datums to be written, and said read requests include a target address of datums to be read and a quantity of data to be read.

12. The integrated circuit of claim 10, wherein arbitration according to the scheduling method includes selection of transfer segments for interleaving based on a Least Recently Used (LRU) scheduling method, a Weighted Least Recently Used (WLRU) scheduling method, a Dynamic Bandwidth Allocation (DBA) scheduling method, a Programmable Priority (PPRI) scheduling method, or a Latency-based (LAT) scheduling method.

13. The integrated circuit of claim 10, comprising:
a plurality of separation circuits associated with said first circuit, each one of the plurality of separation circuits coupled to a respective one of the plurality of transmission circuits, each one of the plurality of separation circuits configured to segment the write requests according to a maximum transfer segment size and configured to segment the read requests according to a maximum number of datums to be read.

14. The integrated circuit of claim 13, comprising:
at least one buffer associated with said first circuit and configured to store outgoing write request data and incoming read request data.

15. A direct memory access (DMA) method comprising:
generating a plurality of direct memory access (DMA) data requests via a plurality of transmission circuits, the DMA data requests including read requests and write requests;
receiving the DMA data requests with a first circuit of a communication system, the first circuit distinct from an interconnection network;
segmenting, with the first circuit, the DMA data requests into transfer segments;
interleaving, with the first circuit, the transfer segments into a series of interleaved DMA segments;
arbitrating, with the first circuit, the interleaving of the transfer segments based on a scheduling method;
converting, with a second circuit of the communication system, said series of interleaved DMA segments into data packets that conform to a first communication protocol, the second circuit distinct from the interconnection network and coupled between the first circuit and the interconnection network;
transmitting, with the second circuit, the data packets to the interconnection network, the interconnection network configured to operate according to the first communication protocol.

16. The DMA method of claim 15, wherein said write requests include datums to be written and a destination address for the datums to be written, and said read requests include a target address of datums to be read and a quantity of data to be read.

17. The DMA method of claim 15, comprising:
selecting a maximum number of datums to be written when the DMA data request is a write request; and
selecting a maximum number of datums to be read with the respective transfer segment of a read request.

18. The DMA method of claim 15, comprising:
reading a first context saved in a first register when the first circuit requests transmission of a first transfer segment belonging to a write request or a read request previously started, and
writing a second context in a second register when the second circuit signals that transmission of a second transfer segment has been completed.

* * * * *